(12) United States Patent
Granger et al.

(10) Patent No.: US 12,455,453 B2
(45) Date of Patent: Oct. 28, 2025

(54) LENS ASSEMBLY WITH A SUPPLEMENTAL MIRROR

(71) Applicant: Apple Inc., Cupertino, CA (US)

(72) Inventors: Zachary A Granger, Redwood City, CA (US); Juan Carlos Minano Dominguez, Mountain View, CA (US); Julio Chaves, Redwood City, CA (US); Pablo Benitez Gimenez, Madrid (ES); Pablo Zamora Herranz, Madrid (ES)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 18/590,368

(22) Filed: Feb. 28, 2024

(65) Prior Publication Data

US 2024/0361599 A1 Oct. 31, 2024

Related U.S. Application Data

(60) Provisional application No. 63/498,138, filed on Apr. 25, 2023.

(51) Int. Cl.
*G02B 27/01* (2006.01)
*G02B 7/182* (2021.01)
*G02B 17/08* (2006.01)
*G02B 27/28* (2006.01)

(52) U.S. Cl.
CPC ......... *G02B 27/0172* (2013.01); *G02B 7/182* (2013.01); *G02B 17/0856* (2013.01); *G02B 27/0179* (2013.01); *G02B 27/28* (2013.01)

(58) Field of Classification Search
CPC .............. G02B 27/017; G02B 27/0172; G02B 27/0179; G02B 27/28; G02B 27/0856; G02B 7/182
See application file for complete search history.

(56) References Cited

U.S. PATENT DOCUMENTS

| 2,638,033 | A | 5/1953 | Buchele et al. |
| 5,793,538 | A | 8/1998 | Cameron et al. |
| 7,029,150 | B2 | 4/2006 | Finch |
| 7,173,694 | B2 | 2/2007 | Goldberg et al. |
| 7,336,299 | B2 | 2/2008 | Kostrzewski et al. |
| 11,054,646 | B1 | 7/2021 | Chan et al. |
| 11,119,321 | B2 | 9/2021 | Montevirgen et al. |
| 2013/0329282 | A1 | 12/2013 | Nakano |

(Continued)

FOREIGN PATENT DOCUMENTS

JP H1167 U * 12/1998 ......... G02B 27/0101

*Primary Examiner* — Cory A Almeida
(74) *Attorney, Agent, or Firm* — Treyz Law Group, P.C.; Joseph F. Guihan; Jinie M. Guihan (57) ABSTRACT

An electronic device may include a display panel configured to produce light and a lens assembly that receives the light from the display panel. The lens assembly may be a catadioptric lens assembly with a partially reflective layer, lens element, quarter wave plate, and reflective polarizer. Some of the light emitted by the display panel may be reflected by the catadioptric lens assembly away from the catadioptric lens assembly. A supplemental mirror may be used to reflect this light back towards the catadioptric lens assembly. The supplemental mirror may increase the field-of-view of images viewable through the catadioptric lens assembly. The supplemental mirror may have a dithered upper surface or a phase-shift mask.

20 Claims, 8 Drawing Sheets

(56) References Cited

U.S. PATENT DOCUMENTS

| | | | |
|---|---|---|---|
| 2014/0092283 A1* | 4/2014 | Yang | G02B 7/182 |
| | | | 359/291 |
| 2014/0226203 A1 | 8/2014 | Nakano et al. | |
| 2017/0186231 A1* | 6/2017 | Petrov | G06F 3/0304 |
| 2019/0369374 A1 | 12/2019 | Forcht et al. | |
| 2021/0181519 A1* | 6/2021 | Uhlendorf | G02B 26/0833 |
| 2021/0294105 A1* | 9/2021 | He | G02B 9/34 |

* cited by examiner

LENS ASSEMBLY WITH A SUPPLEMENTAL MIRROR

This application claims the benefit of U.S. provisional patent application No. 63/498,138 filed Apr. 25, 2023, which is hereby incorporated by reference herein in its entirety.

BACKGROUND

This relates generally to optical systems and, more particularly, to optical systems in electronic devices.

Electronic devices such as head-mounted devices use lenses to display images for a user. A microdisplay may create images for each of a user's eyes. A lens may be placed between each of the user's eyes and a portion of the microdisplay so that the user may view virtual reality content.

If care is not taken, a head-mounted device may be cumbersome and tiring to wear. Optical systems for head-mounted devices may use arrangements of lenses that are bulky and heavy. Extended use of a head-mounted device with this type of optical system may be uncomfortable.

It would therefore be desirable to be able to provide improved electronic devices.

SUMMARY

An electronic device may include a catadioptric optical assembly, a display panel that is configured to emit light towards the catadioptric optical assembly, wherein a subset of the light is reflected by the catadioptric optical assembly away from the catadioptric optical assembly, and at least one mirror that is configured to reflect the subset of the light back towards the catadioptric optical assembly.

An electronic device may include a lens element, a display panel that is configured to emit light towards the lens element, a partially reflective layer that is interposed between the display panel and the lens element and that has a reflectance that is between 40% and 60%, a reflective polarizer, a quarter wave plate that is interposed between the reflective polarizer and the partially reflective layer, and a mirror that is adjacent to the display panel and that has a reflectance that is greater than 90%.

An electronic device may include a display panel, first and second lens elements, an adjustable linear polarizer that is interposed between the display panel and the first lens element, first, second, and third quarter wave plates, a mirror, a reflective polarizer that is interposed between the first and second lens elements, and a partially reflective layer that is interposed between the second lens element and the third quarter wave plate. The first quarter wave plate may be interposed between the mirror and the first lens element and the second quarter wave plate may be interposed between the reflective polarizer and the second lens element.

DETAILED DESCRIPTION

Figure 1:
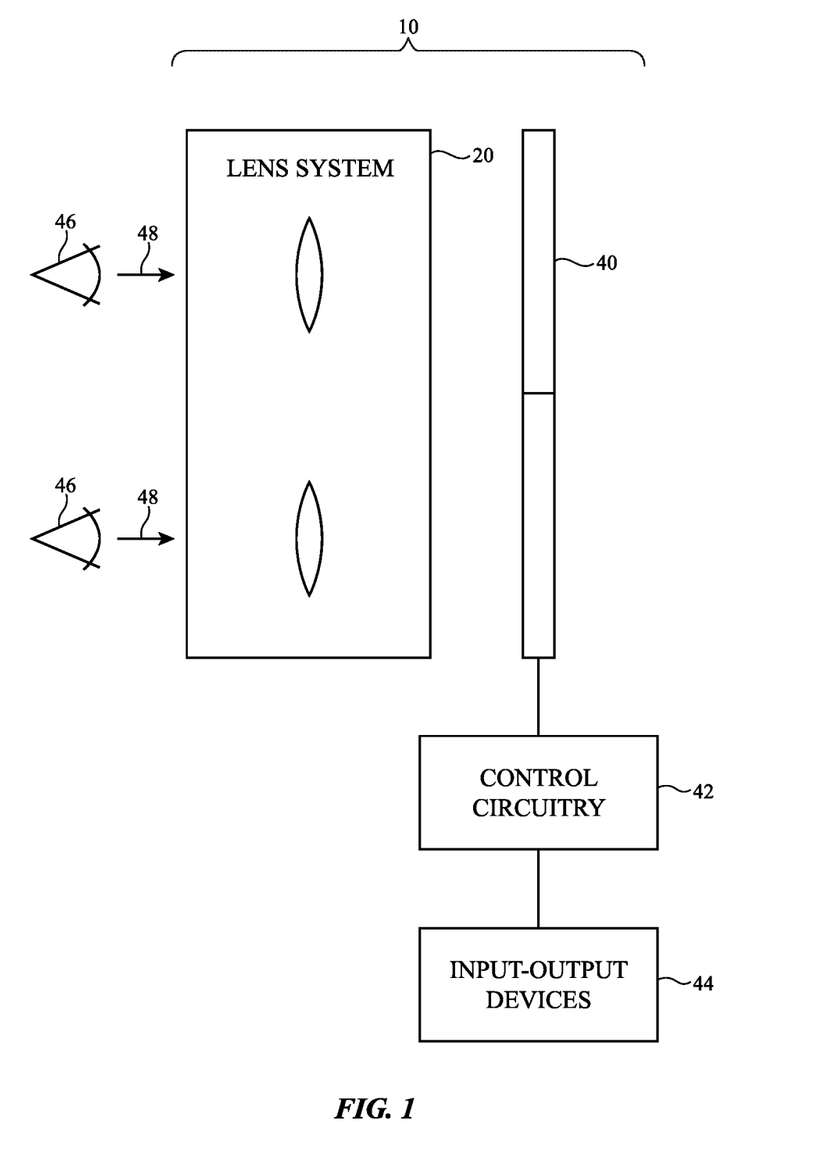
FIG. 1 is a diagram of an illustrative electronic device in accordance with some embodiments.

An illustrative electronic device of the type that may be provided with a display is shown in FIG. 1. As shown in FIG. 1, electronic device 10 (sometimes referred to as glasses 10, virtual reality glasses 10, augmented reality glasses 10, extended reality glasses 10, head-mounted device 10, head-mounted display 10, device 10, etc.) may include a display system such as display system 40 that creates images and may have an optical system such as optical system 20 through which a user 46 (see, e.g., user's eyes 46) may view the images produced by display system 40 by looking in direction 48.

Display system 40 (sometimes referred to as display panel 40 or display 40) may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in electronic device 10 and/or control circuitry that is mounted outside of electronic device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such computer-generated content, pre-recorded video for a movie or other media, or other images. In general, any suitable content may be presented to a user by control circuitry 42 using display system 40 and optical system 20 of electronic device 10.

Input-output devices 44 may be coupled to control circuitry 42. Input-output devices 44 may be used to gather user input from a user, may be used to make measurements on the environment surrounding electronic device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of electronic device 10, proximity sensors, capacitive touch sensors, strain gauges, gas sensors, pressure sensors, ambient light sensors, and/or other sensors). If desired, input-output devices 44 may include one or more cameras/optical sensors (e.g., cameras for capturing images of the user's surroundings, cameras for performing gaze detection operations by viewing eyes 46, and/or other cameras).

Figure 2:
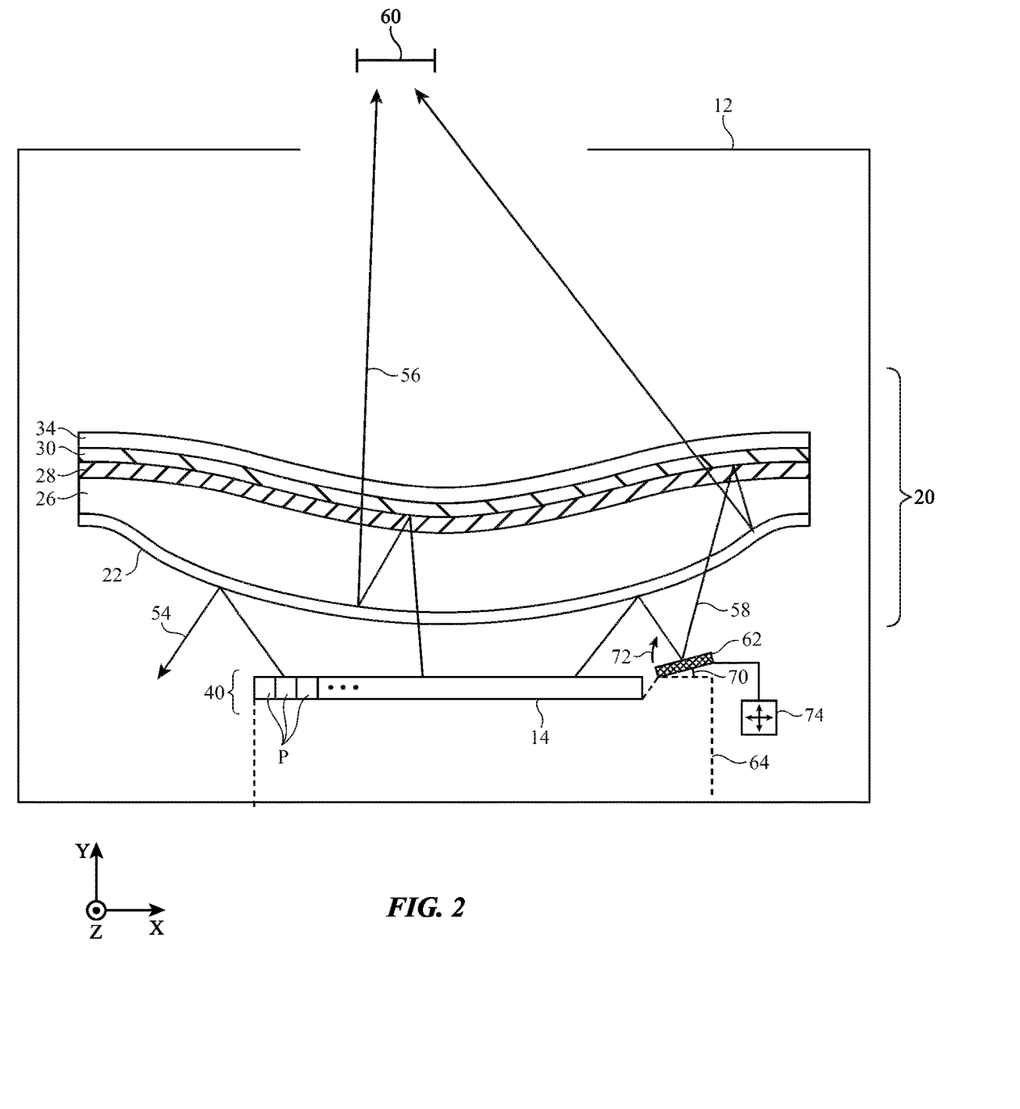
FIG. 2 is a side view of an illustrative electronic device with an optical assembly and a supplemental mirror in accordance with some embodiments.

FIG. 2 is a side view of electronic device 10 showing how optical system 20 and display system 40 may be supported by head-mounted support structures such as housing 12 for electronic device 10. Housing 12 may have the shape of a frame for a pair of glasses (e.g., electronic device 10 may resemble eyeglasses), may have the shape of a helmet (e.g., electronic device 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to electronic device 10 using a cable, wireless connection, or other signal paths.

Display system 40 and the optical components of electronic device 10 may be configured to display images for user 46 using a lightweight and compact arrangement. Optical system 20 (sometimes referred to as a lens assembly, lens module, optical assembly, optical module, etc.) may, for example, be based on catadioptric lenses (e.g., lenses that use both reflecting and refracting of light). Optical system 20 may therefore sometimes be referred to as a catadioptric optical assembly, a catadioptric lens assembly, a catadioptric optical module, a catadioptric lens module, etc.

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). Display system 40 may also include additional optical components such as a linear polarizer, a wave plate such as a quarter wave plate, etc.

Optical system 20 may include a lens element such as lens element 26 (sometimes referred to as lens 26). Lens element 26 may be formed from a transparent material such as plastic or glass. Lens element 26 may have a surface that faces display system 40 (sometimes referred to as a display-facing surface) and a surface that faces the user (sometimes referred to as an eye-facing surface or viewer-facing surface). Each surface of lens element 26 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. A freeform surface may include both convex and concave portions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface.

A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. In one illustrative arrangement, shown in FIG. 2, the surface of lens element 26 facing display system 40 is a convex surface and the surface of lens element 26 facing eye-box 60 is a concave surface. Eye-box 60 may refer to the expected location of the user's eye (e.g., eye 46 in FIG. 1) during operation of device 10.

Optical structures such as partially reflective coatings, wave plates, reflective polarizers, linear polarizers, antireflection coatings, and/or other optical components may be incorporated into electronic device 10 (e.g., lens assembly 20, etc.). These optical structures may allow light rays from display system 40 to pass through and/or reflect from surfaces in optical system 20, thereby providing optical system 20 with a desired lens power.

An illustrative arrangement for the optical layers is shown in FIG. 2. As shown in FIG. 2, a partially reflective mirror (e.g., a metal mirror coating or other mirror coating such as a dielectric multilayer coating with a 50% transmission and a 50% reflection) such as partially reflective mirror 22 may be formed on the convex surface of lens element 26. Partially reflective mirror 22 may sometimes be referred to as beam splitter 22, half mirror 22, partially reflective layer 22, etc. Partially reflective layer 22 may have a reflectance that is greater than 20%, greater than 40%, less than 80%, less than 60%, between 40% and 60%, etc.

A wave plate such as wave plate 28 may be formed on the concave surface of lens element 26. Wave plate 28 may be attached to lens element 26 (e.g., using an optically clear adhesive layer or via coating directly to the lens element without an intervening adhesive layer). Wave plate 28 (sometimes referred to as retarder 28, quarter wave plate 28, etc.) may be a quarter wave plate that conforms to the concave surface of lens element 26.

Reflective polarizer 30 may be attached to retarder 28 (e.g., using an optically clear adhesive layer or via coating directly to the retarder without an intervening adhesive layer). Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30.

Polarizer 34 may be attached to reflective polarizer 30 (e.g., using an optically clear adhesive layer or via coating directly to the reflective polarizer without an intervening adhesive layer). Polarizer 34 may be a linear polarizer. Polarizer 34 may sometimes be referred to as an external blocking linear polarizer 34 or cleanup polarizer 34. Linear polarizer 34 may have a pass axis aligned with the pass axis of reflective polarizer 30. Polarizer 34 may be omitted if desired.

The arrangement of optical module 20 in FIG. 2 is merely illustrative. In general, the optical module may include any desired number of lens elements and any desired arrangement of functional layers. As additional examples, the optical module may include one or more additional lens elements. At least one of the lens elements in optical module 20 may be a removable lens element if desired. A user may be able to easily remove and replace a removable lens element within lens assembly 20. This may allow the removable lens element to be customizable (e.g., to adjust for a user's changing eyesight). At least one of the lens elements in optical module 20 may be a non-removable lens element and may be referred to as a permanent lens element, fixed lens element, non-removable lens element, etc.

Some of the light emitted by pixel array 14 may follow path 56. Along path 56, the light passes towards eye-box 60 through partially reflective layer 22, lens element 26, and wave plate 28 before being reflected by reflective polarizer 30. After being reflected by reflective polarizer 30, the light passes away from eye-box 60 through wave plate 28 and lens element 26 before being reflected by partially reflective layer 22. After being reflected by partially reflective layer 22, the light passes towards eye-box 60 through lens element 26, wave plate 28, reflective polarizer 30, and linear polarizer 34. The light on path 56 may be refracted one or more times while passing through the lens assembly.

Light that follows path 56 passes through the partially reflective layer 22 when emitted from display panel 14 towards the partially reflective layer. Some light that is emitted from display panel 14 towards the partially reflective layer may be reflected by the partially reflective layer. Paths 54 and 58 show possible paths of light that is initially reflected by partially reflective layer 22.

As shown in FIG. 2, light following path 54 is reflected off the partially reflective layer 22. Without the presence of a supplemental mirror, this light is lost and does not contribute to the image perceived at eye-box 60. To capture this light and increase the efficiency of the display, one or more supplemental mirrors may be included in the electronic device.

FIG. 2 shows an example of supplemental mirror 62 positioned adjacent to display panel 14. Mirror 62 and display panel 14 may be separated by a gap that is less than 10 millimeters, less than 1 millimeter, less than 0.1 millimeter, less than 0.01 millimeter, etc. As shown by path 58, light may be emitted from display 14 towards eye-box 60 and may be reflected by partially reflective layer 22 away from eye-box 60. Supplemental mirror 62 then reflects the light towards eye-box 60 where the light passes through partially reflective layer 22, lens element 26, and wave plate 28 before being reflected by reflective polarizer 30. After being reflected by reflective polarizer 30, the light passes away from eye-box 60 through wave plate 28 and lens element 26 before being reflected by partially reflective layer 22. After being reflected by partially reflective layer 22, the light passes towards eye-box 60 through lens element 26, wave plate 28, reflective polarizer 30, and linear polarizer 34.

Said another way, light that follows path 56 is transmitted through partially reflective layer 22 at the first incidence of the light upon the partially reflective layer. In contrast, light that follows path 58 is reflected by partially reflective layer 22 at the first incidence of the light upon the partially reflective layer and then transmitted through partially reflective layer 22 at the second incidence of the light upon the partially reflective layer.

Including supplemental mirror 62 adjacent to display panel 14 captures some of the light emitted by display panel 14 that would otherwise be lost. The presence of supplemental mirror 62 may increase the field-of-view associated with display panel 14 (without increasing the size of display panel 14 itself).

The display panel 14 and supplemental mirror 62 may optionally be coupled to a common support structure 64. Support structure 64 may be part of housing 12 or may be formed separately from housing 12 and attached to housing 12.

Figure 3:
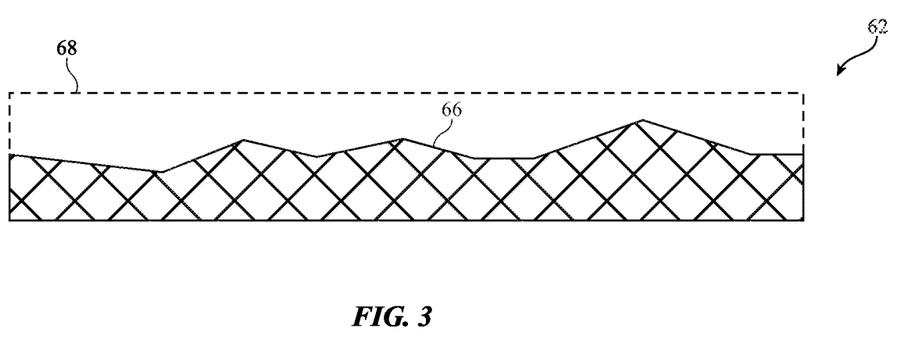
FIG. 3 is a cross-sectional side view of an illustrative mirror with a dithered upper surface in accordance with some embodiments.

A cross-sectional side view of mirror 62 is shown in FIG. 3. Mirror 62 may have a reflectance that is greater than 80%, greater than 90%, greater than 95%, greater than 97%, greater than 99%, etc. As shown in FIG. 3, mirror 62 may have a dithered upper surface 66. The dithered upper surface has different, non-parallel portions (e.g., in a grid across the upper surface or in strips across the upper surface). The different, non-parallel portions may have different (e.g., randomized) angles relative to each other. The dithered upper surface 66 may cause light to be reflected at slightly different angles, effectively blurring the light reflected by mirror 62. Blurring the light reflected by mirror 62 may improve the appearance of the light reflected by mirror 62 when the light is ultimately received at eye-box 60.

Instead or in addition to having a dithered upper surface, mirror 62 may optionally be covered by a phase-shift mask 68. The phase-shift mask may include different portions with different thicknesses, different refractive indices, and/or different transparencies to adjust the phase of the incident light by varying amounts. The phase-shift mask effectively blurs the light reflected by mirror 62. Blurring the light reflected by mirror 62 may improve the appearance of the light reflected by mirror 62 when the light is ultimately received at eye-box 60. Phase-shift mask 68 may be used when the mirror has a planar upper surface (as in FIG. 2) or a dithered upper surface (as in FIG. 3).

Returning to FIG. 2, mirror 62 may be positioned at an angle 70 relative to a planar upper surface of display panel 14. The magnitude of angle 70 may determine where the light reflected by mirror 62 is ultimately perceived in the image viewed at eye-box 60. In some cases, angle 70 may be fixed (and the position of the reflected light by mirror 62 at eye-box 60 is fixed). Alternatively, the angle of mirror 62 may be adjusted in real time (e.g., by rotating the mirror in direction 72). Electronic device 10 may include a computer-controlled positioner 74 (e.g., an actuator) that selectively rotates mirror 62 along direction 72.

Figure 4A:
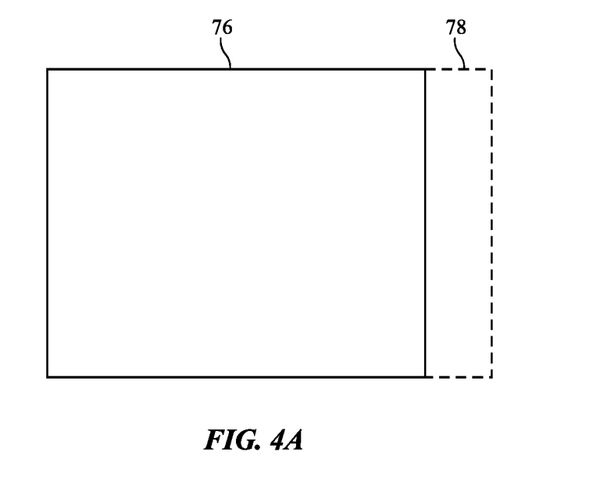
FIG. 4A is a top view of an illustrative image viewable at an eye-box where a supplemental image is presented adjacent to a primary image in accordance with some embodiments.

Mirror 62 may be positioned to increase the field-of-view at eye-box 60. FIG. 4A is a view of an image associated with this type of arrangement. The solid outline in FIG. 4A shows a primary image 76 provided to eye-box 60 without the presence of supplemental mirror 62 (e.g., using light that follows paths such as path 56 in FIG. 2). The dashed outline shows the supplemental light 78 provided to eye-box 60 by supplemental mirror 62 (e.g., using light that follows paths such as path 58 in FIG. 2). In other words, supplemental mirror 62 may be positioned and angled to provide supplemental image 78 adjacent to primary image 76 such that the supplemental image merges with the primary image to cause a single, larger image to be perceived by a user at eye-box 60. The field-of-view of display 14 is effectively increased by mirror 62 in this type of arrangement.

Figure 4B:
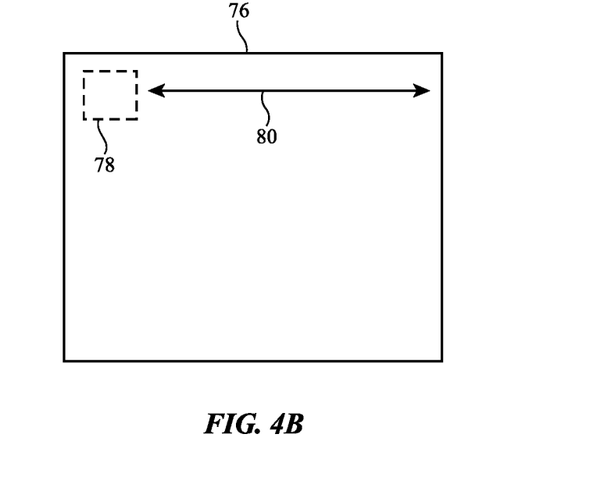
FIG. 4B is a top view of an illustrative image viewable at an eye-box where a supplemental image is superimposed on a primary image in accordance with some embodiments.

Mirror 62 may instead be positioned to superimpose a supplemental image over a primary image. FIG. 4B is a top view showing this type of arrangement. The solid outline in FIG. 4B shows a primary image 76 provided to eye-box 60 without the presence of supplemental mirror 62. The dashed outline shows the supplemental image 78 provided to eye-box 60 by supplemental mirror 62. In other words, supplemental mirror 62 may be positioned and angled to provide a supplemental image 78 that overlaps primary image 76. The supplemental mirror 62 may be selectively rotated to cause the position of supplemental image 78 to shift (e.g., along direction 80 across primary image 76). Control circuitry 42 may use computer-controlled positioner 74 to adjust the position of mirror 62 and cause the position of supplemental image 78 to overlap a desired portion of primary image 76.

The examples in FIGS. 4A and 4B are merely illustrative. In general, the supplemental image 78 provided by supplemental mirror 62 may have a fixed position (as in FIG. 4A), may have an adjustable position (as in FIG. 4B), may overlap the primary image (as in FIG. 4B), may not overlap the primary image (as in FIG. 4A), may partially overlap the primary image, etc.

Figure 5:
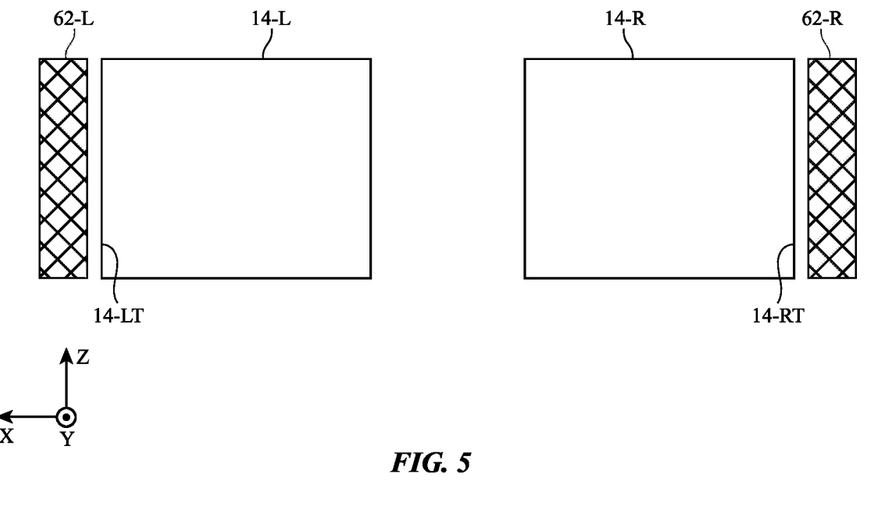
FIG. 5 is a top view of an illustrative electronic device with supplemental mirrors formed as strips along the temporal edges of first and second displays in accordance with some embodiments.
Figure 6:
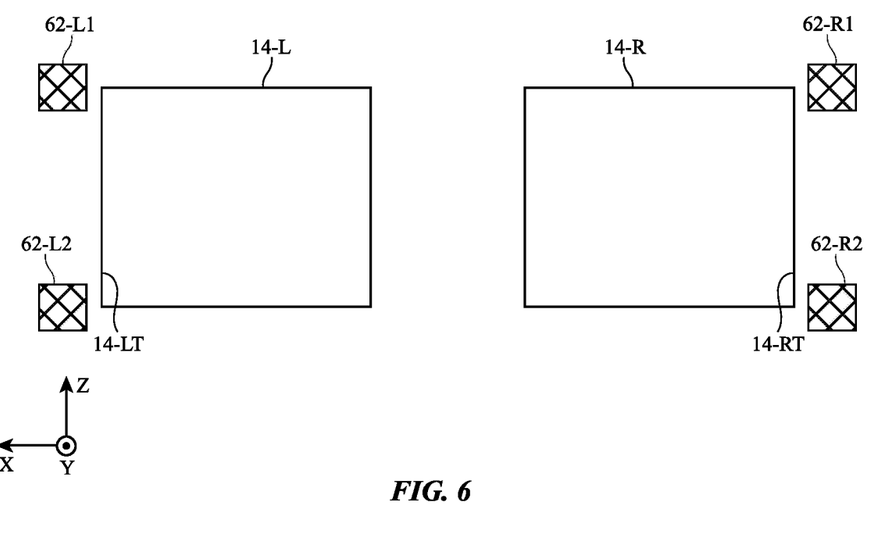
FIG. 6 is a top view of an illustrative electronic device with supplemental mirrors formed as patches along the temporal edges of first and second displays in accordance with some embodiments.
Figure 7:
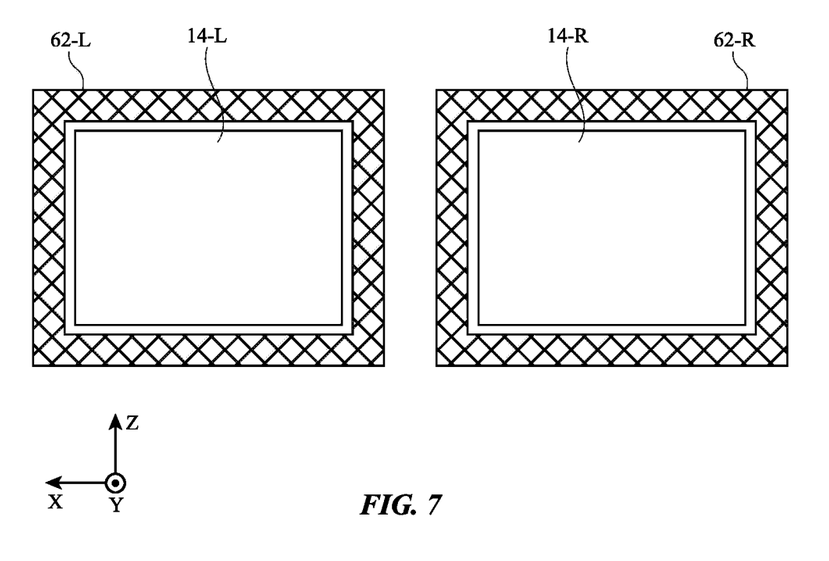
FIG. 7 is a top view of an illustrative electronic device with supplemental ring-shaped mirrors in accordance with some embodiments.

In general, supplemental mirror(s) 62 may have any desired footprint within electronic device 10. FIGS. 5-7 are views of illustrative electronic devices with supplemental mirrors having varying footprints.

In each one of FIGS. 5-7, there is a first display panel 14-L configured to provide an image for a left eye of the user and a second display panel 14-R configured to provide an image for a right eye of the user. It is noted that these two display panels may instead be merged into a single display panel that provides a first image for the left eye of the user and a second image for the right eye of the user.

As shown in FIG. 5, there may be a gap between display panels 14-L and 14-R. This gap may be aligned with a user's nose during operation of electronic device 10, for example. Each display panel may be described as having first and second opposing sides, with one side closer to the user's nose during operation of device 10 and one side closer to the user's temple during operation of device 10. Display 14-L has a temporal side 14-LT adjacent to the user's left temple when device 10 is worn on the head of a user. Display 14-R has a temporal side 14-RT adjacent to the user's right temple when device 10 is worn on the head of a user.

In FIG. 5, a first supplemental mirror 62-L is positioned adjacent to an edge of display panel 14-L and a second supplemental mirror 62-R is positioned adjacent to an edge of display panel 14-R. Mirror 62-L extends in a strip along temporal side 14-LT of display panel 14-L and mirror 62-R extends in a strip along temporal side 14-RT of display panel 14-R. Mirror 62-L has a dimension (parallel to the Z-axis) that is equal to or greater than the same dimension of display panel 14-L. Mirror 62-R has a dimension (parallel to the Z-axis) that is equal to or greater than the same dimension of display panel 14-R. This example is merely illustrative and mirrors 62-R and 62-L may optionally extend only partially along the temporal edge of the respective display panel if desired.

In another possible arrangement, shown in FIG. 6, first and second mirrors 62-L1 and 62-L2 are positioned adjacent to the corners of display panel 14-L along temporal edge 14-LT and first and second mirrors 62-R1 and 62-R2 are positioned adjacent to the corners of display panel 14-R along temporal edge 14-RT. These mirrors may be described as patches. Each mirror has a dimension (parallel to the Z-axis) that is less than the same dimension of its respective display panel.

In yet another possible arrangement, shown in FIG. 7, a first mirror 62-L is formed in a ring around display panel 14-L. Mirror 62-L may be referred to as an annular mirror or ring-shaped mirror. The footprint of display panel 14-L is completely laterally surrounded by the footprint of mirror 62-L. A second mirror 62-R is formed in a ring around display panel 14-R. Mirror 62-R may be referred to as an annular mirror or ring-shaped mirror. The footprint of display panel 14-R is completely laterally surrounded by the footprint of mirror 62-R.

In general, any desired number of mirrors may be arranged at any desired positions relative to the display panels. Each mirror may have any desired angle relative to the display panels and may optionally be rotatable.

Figure 8:
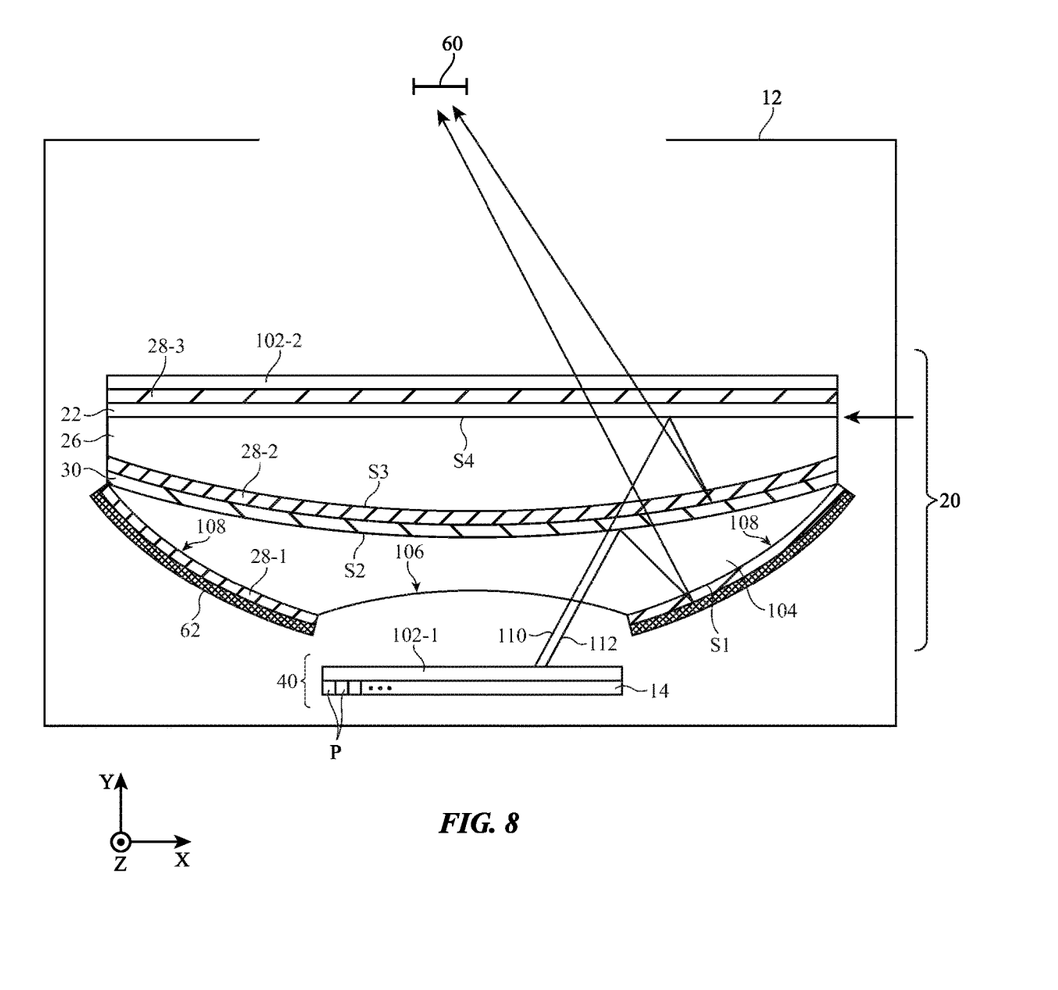
FIG. 8 is a side view of an illustrative electronic device with three quarter wave plates, a supplemental mirror, and two adjustable linear polarizers in accordance with some embodiments.

FIG. 8 is a side view of electronic device 10 showing an alternate arrangement for an electronic device with an optical system, a display system, and a supplemental mirror. In FIG. 8, display system 40 includes a display panel 14 and an adjustable linear polarizer 102-1. Adjustable linear polarizer 102-1 may be operable in a first state in which light having a first polarization (e.g., horizontally linearly polarized light) is transmitted and light having a second polarization (e.g., vertically linearly polarized light) is not transmitted and a second state in which light having the first polarization (e.g., horizontally linearly polarized light) is not transmitted and light having the second polarization (e.g., vertically linearly polarized light) is transmitted. Effectively, adjustable linear polarizer 102-1 may output linearly polarized light from display panel 14 with either the first polarization or the second polarization.

Adjustable linear polarizer 102-1 includes an absorption polarizer and a polarization rotator. The polarization rotator may comprise a liquid crystal cell. The polarization rotator may selectively rotate the polarization of light between the first and second polarizations. Light from display panel 14 may first pass through the absorption polarizer of adjustable linear polarizer 102-1 and then pass through the polarization rotator of adjustable linear polarizer 102-1.

Optical assembly 20 in FIG. 8 includes a first lens element 26 and a second lens element 104. Each one of the lens elements may be formed from a transparent material such as plastic or glass. Each surface of lens elements 26 and 104 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface.

Lens element 104 has a first surface S1 that faces display system 40 and a second surface S2 that faces eye-box 60. Lens element 26 has a first surface S3 that faces display system 40 and a second surface S4 that faces eye-box 60. As shown in FIG. 8, a first wave plate 28-1 may be formed on at least some of surface S1. A mirror 62 is formed over wave plate 28-1 such that wave plate 28-1 is interposed between mirror 62 and lens element 104. As shown in FIG. 8, surface S1 has a central concave portion 106 and a peripheral convex portion 108. The wave plate 28-1 and mirror 62 are formed over (overlapping with) peripheral convex portion 108 of surface S1 but not central concave portion 106 of surface S1.

Central concave portion 106 may have a footprint that is larger than the footprint of display 14 such that all of the light emitted by display 14 initially enters lens element 104 at central concave portion 106.

A reflective polarizer 30 and wave plate 28-2 are formed between lens elements 26 and 104. Reflective polarizer 30 is interposed between wave plate 28-2 and lens element 104. Wave plate 28-2 is interposed between reflective polarizer 30 and lens element 26.

A partially reflective layer 22, a wave plate 28-3, and an adjustable linear polarizer 102-2 are formed on surface S4 of lens element 26. Partially reflective layer 22 is interposed between lens element 26 and wave plate 28-3. Wave plate 28-3 is interposed between partially reflective layer 22 and adjustable linear polarizer 102-2. Adjustable linear polarizer 102-2 is interposed between wave plate 28-3 and eye-box 60. Adjustable linear polarizer 102-2 may be omitted if desired.

Each one of wave plates 28-1, 28-2, and 28-3 (sometimes referred to as retarders, quarter wave plates, etc.) may be quarter wave plates. Partially reflective layer 22 may have a reflectance that is greater than 20%, greater than 40%, less than 80%, less than 60%, between 40% and 60%, etc. Partially reflective layer 22 may have a transmittance that is greater than 20%, greater than 40%, less than 80%, less than 60%, between 40% and 60%, etc. In contrast, mirror 62 may have a reflectance that is greater than 80%, greater than 90%, greater than 95%, greater than 97%, greater than 99%, etc. In other words, mirror 62 is more reflective than partially reflective mirror 22.

Adjustable linear polarizer 102-2 may be operable in a first state in which light having a first polarization (e.g., horizontally linearly polarized light) is transmitted and light having a second polarization (e.g., vertically linearly polarized light) is not transmitted and a second state in which light having the first polarization (e.g., horizontally linearly polarized light) is not transmitted and light having the second polarization (e.g., vertically linearly polarized light) is transmitted. Adjustable linear polarizer 102-2 includes an absorption polarizer and a polarization rotator. The polarization rotator may comprise a liquid crystal cell. The polarization rotator may selectively rotate the polarization of light between the first and second polarizations. Light may first pass through the polarization rotator of adjustable linear polarizer 102-2 and then pass through the absorption polarizer of adjustable linear polarizer 102-2. Effectively, adjustable linear polarizer 102-2 may pass light with the first polarization or may pass light with the second polarization (although the polarization of the light output from adjustable linear polarizer 102-2 is the same in both instances).

Electronic device 10 may be operable in a first state in which adjustable linear polarizer 102-1 is in a first state, adjustable linear polarizer 102-2 is in a first state, and light follows path 110. Electronic device 10 may be operable in a second state in which adjustable linear polarizer 102-1 is in a second state, adjustable linear polarizer 102-2 is in a second state, and light follows path 112.

First, consider path 110 when adjustable linear polarizers 102-1 and 102-2 are in a first state. Display system 40 emits light that is then transmitted with a first polarization by adjustable linear polarizer 102-1. The light passes through central concave portion 106 of lens element 104, reflective polarizer 30, quarter wave plate 28-2, and lens element 26 and is then reflected by partially reflective layer 22. The reflected light passes back through lens element 26 and quarter wave plate 28-2 and is reflected by reflective polarizer 30. The light then passes through quarter wave plate 28-2, lens element 26, partially reflective layer 22, quarter wave plate 28-3, and adjustable linear polarizer 102-2.

Next, consider path 112 when adjustable linear polarizers 102-1 and 102-2 are in a second state. Display system 40 emits light that is then transmitted with a second polarization by adjustable linear polarizer 102-1. The light passes through central concave portion 106 of lens element 104 and is then reflected by reflective polarizer 30. The light passes back through lens element 104 and through quarter wave plate 28-1 and is reflected by mirror 62. The light then passes through quarter wave plate 28-1, lens element 104, reflective polarizer 30, quarter wave plate 28-2, lens element 26, partially reflective layer 22, quarter wave plate 28-3, and adjustable linear polarizer 102-2.

Figure 9:
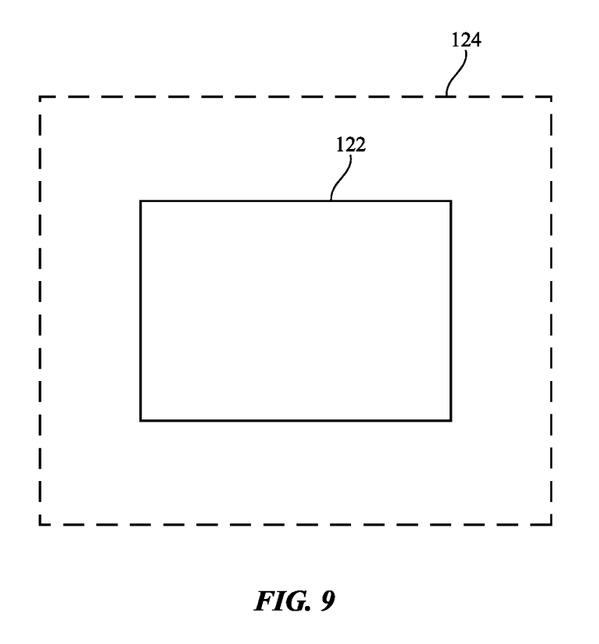
FIG. 9 is a top view of an illustrative image viewable at an eye-box with a central region and a peripheral region in accordance with some embodiments.

In other words, light from the same pixel and at the same angle of emission may take different paths through optical system 20 to eye-box 60 depending on the state of adjustable polarizers 102-1 and 102-2. Each display frame may therefore be divided into first and second subframes. During each first subframe, adjustable linear polarizers 102-1 and 102-2 are in a first state and light from display panel 14 follows path 110. During each second subframe, adjustable linear polarizers 102-1 and 102-2 are in a second state and light from display panel 14 follows path 112. As shown in FIG. 9, the first subframe may be used to provide light for a central portion 122 of the image perceived at eye-box 60. The second subframe may be used to provide light for a peripheral portion 124 of the image perceived at eye-box 60.

Display panel 14 may be operable at a given refresh rate such as 240 Hz. The display panel may alternate between a first subframe and a second subframe using the refresh rate of 240 Hz. The effective refresh rate (e.g., including the time to present both the first and second subframes) is half of the given refresh rate (in this case, 240 Hz/2=120 Hz). The refresh rate is sufficiently high for the first and second subframes of each frame to be perceived as one merged image at eye-box 60. The example of using a refresh rate of 240 Hz is merely illustrative. In general, display panel 14 may have any desired refresh rate (e.g., 60 Hz or more, 90 Hz or more, 120 Hz or more, 180 Hz or more, 240 Hz or more, less than 240 Hz, etc.).

Each adjacent pair of components in FIG. 8 may optionally be attached using an optically clear adhesive layer. Each adjacent pair of components in FIG. 8 may alternatively be coated directly to one another without an intervening adhesive layer.

The arrangement of optical module 20 in FIG. 8 is merely illustrative. In general, the optical module may include any desired number of lens elements and any desired arrangement of functional layers. For example, quarter wave plate 28-2 may instead be positioned between S4 of lens element 26 and partially reflective layer 22 (as shown by the arrow on the right side of FIG. 8). Lens element 104 may be physically and optically coupled directly to display system 40 if desired. As additional examples, the optical module may include one or more additional lens elements. At least one of the lens elements in optical module 20 may be a removable lens element if desired.

A lens assembly of the type shown in FIG. 2 or 8 may be included for each eye of the viewer (e.g., a first lens assembly for the left eye and a second lens assembly for the right eye).

The foregoing is merely illustrative and various modifications can be made to the described embodiments. The foregoing embodiments may be implemented individually or in any combination.

What is claimed is:

1. An electronic device, comprising:
   a catadioptric optical assembly;
   a display panel that is configured to emit light towards a central portion of the catadioptric optical assembly, wherein a subset of the light is reflected by the catadioptric optical assembly away from the catadioptric optical assembly; and
   at least one mirror that is configured to receive the subset of the light from a peripheral portion of the catadioptric optical assembly, and to blur and reflect the subset of the light back towards the catadioptric optical assembly as a blurred and reflected subset of the light, and wherein an entirety of the catadioptric optical assembly is configured to pass at least a portion of the blurred and reflected subset of the light.

2. The electronic device defined in claim 1, wherein the at least one mirror is positioned adjacent to the display panel.

3. The electronic device defined in claim 1, wherein the display panel has first and second opposing sides connected by third and fourth opposing sides and wherein the at least one mirror comprises a first mirror that extends in a strip along the first side of the display panel.

4. The electronic device defined in claim 1, wherein the display panel has first and second opposing sides connected by third and fourth opposing sides and wherein the at least one mirror comprises first and second mirrors that are patches adjacent to the first side of the display panel.

5. The electronic device defined in claim 1, wherein the display panel has a first footprint, wherein the at least one mirror comprises a ring-shaped mirror with a second footprint, and wherein the second footprint laterally surrounds the first footprint.

6. The electronic device defined in claim 1, wherein the at least one mirror has a reflectance that is greater than 90%.

7. The electronic device defined in claim 1, wherein the catadioptric optical assembly comprises at least a partially reflective layer, a lens element, a wave plate, and a reflective polarizer.

8. The electronic device defined in claim 7, wherein the partially reflective layer has a reflectance that is less than 60% and wherein the at least one mirror has a reflectance that is greater than 90%.

9. The electronic device defined in claim 7, wherein the partially reflective layer is interposed between the display panel and the lens element, wherein the lens element is interposed between the partially reflective layer and the wave plate, and wherein the wave plate is interposed between the lens element and the reflective polarizer.

10. The electronic device defined in claim 9, wherein the subset of the light is reflected by the partially reflective layer towards the at least one mirror.

11. The electronic device defined in claim 10, wherein the subset of the light is configured to reflect off the at least one mirror, then pass through the partially reflective layer, the lens element, and the wave plate, then reflect off the reflective polarizer, then pass through the wave plate and the lens element, then reflect off the partially reflective layer, and then pass through the lens element, the wave plate, and the reflective polarizer towards an eye-box.

12. The electronic device defined in claim 1, wherein the at least one mirror has a dithered upper surface.

13. The electronic device defined in claim 1, wherein an upper surface of the at least one mirror is covered by a phase-shift mask.

14. The electronic device defined in claim 1, wherein the at least one mirror is configured to rotate between at least first and second positions at respective first and second angles relative to the display panel.

15. The electronic device defined in claim 1, wherein the at least one mirror and the display panel are mounted to a common support structure.

16. An electronic device, comprising:
    a lens element;
    a display panel that is configured to emit light towards the lens element, wherein the display panel is configured to display a primary image;
    a partially reflective layer that is interposed between the display panel and the lens element, wherein the partially reflective layer has a reflectance that is between 40% and 60%;
    a reflective polarizer;
    a quarter wave plate that is interposed between the reflective polarizer and the partially reflective layer; and
    a mirror that is adjacent to the display panel and that has a reflectance that is greater than 90%, wherein the mirror is configured to at least partially superimpose a supplemental image over the primary image.

17. An electronic device, comprising:
    a display panel;
    first and second lens elements;
    an adjustable linear polarizer that is interposed between the display panel and the first lens element, wherein the adjustable linear polarizer is operable in a first state in which light from the display panel passes through the first and second lens elements and is provided to a first region of an eye-box and a second state in which light from the display panel passes through the first and second lens elements and is provided to a second region of the eye-box;
    first, second, and third quarter wave plates;
    a mirror, wherein the first quarter wave plate is interposed between the mirror and the first lens element;
    a reflective polarizer that is interposed between the first and second lens elements, wherein the second quarter wave plate is interposed between the reflective polarizer and the second lens element; and
    a partially reflective layer that is interposed between the second lens element and the third quarter wave plate.

18. The electronic device defined in claim 17, further comprising:
    an additional adjustable linear polarizer, wherein the third quarter wave plate is interposed between the partially reflective layer and the additional adjustable linear polarizer.

19. The electronic device defined in claim 17, wherein the first quarter wave plate and the mirror overlap a peripheral portion of the first lens element but not a central portion of the first lens element.

20. The electronic device defined in claim 17, wherein the first region comprises a central region of the eye-box and the second region comprises a peripheral region of the eye-box.

\* \* \* \* \*